(12) United States Patent
Fournier et al.

(10) Patent No.: US 11,959,464 B2
(45) Date of Patent: Apr. 16, 2024

(54) WIND TURBINE GENERATORS AND METHODS FOR ROTATING A HUB OF A WIND TURBINE

(71) Applicant: General Electric Renovables Espana, S.L., Barcelona (ES)

(72) Inventors: Maxime Fournier, Nantes (FR); Julio Cesar Urresty, Barcelona (ES); Giuseppe Iurisci, Barcelona (ES); Stanislas Haentjens, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/960,313

(22) Filed: Oct. 5, 2022

(65) Prior Publication Data
US 2023/0114619 A1    Apr. 13, 2023

(30) Foreign Application Priority Data
Oct. 8, 2021 (EP) .................................. 21382906

(51) Int. Cl.
*F03D 9/25* (2016.01)

(52) U.S. Cl.
CPC .......... *F03D 9/25* (2016.05); *F05B 2220/706* (2013.01)

(58) Field of Classification Search
CPC ........ F03D 7/0272; F03D 80/82; F03D 80/85; F03D 13/00; F03D 13/35; F03D 13/10; H02K 3/28; H02K 19/32; H02K 2213/09
See application file for complete search history.

(56) References Cited

U.S. PATENT DOCUMENTS

| 6,737,786 B2* | 5/2004 | Hsu .................. H02K 11/05 310/67 R |
| 2016/0036308 A1* | 2/2016 | Bailey .................. H02K 16/04 310/91 |
| 2016/0090962 A1 | 3/2016 | Molla et al. |

FOREIGN PATENT DOCUMENTS

| CN | 207530550 U | 6/2018 | |
| CN | 108631355 A | 10/2018 | |
| EP | 2800898 B1 | 12/2019 | |
| EP | 3617498 A1 * | 3/2020 | ............ F03D 13/10 |
| KR | 101271618 B1 | 6/2013 | |

(Continued)

OTHER PUBLICATIONS

European Search Report Corresponding to EP21382906 dated Mar. 30, 2022.

*Primary Examiner* — Topaz L. Elliott
*Assistant Examiner* — Ryan C Clark
(74) *Attorney, Agent, or Firm* — Dority & Manning, P.A.

(57) ABSTRACT

A method for rotating a hub of a wind turbine in an inching operation to rotate the hub includes reconfiguring the generator from normal operation by coupling a first string of a first electrical phase of the stator in series with a second string of a second electrical phase of the stator, the first and second strings comprising one or more coils coupled in series. Current is provided from a power converter to the first and second strings o rotate the hub. The generator includes a first and a second winding system, each including a plurality of electrical phases in the normal operation. The first string of the first electrical phase is part of the first winding system in normal operation, and the second string of the second electrical phase is part of the second winding system in the normal operation.

13 Claims, 6 Drawing Sheets

(56) References Cited

FOREIGN PATENT DOCUMENTS

WO     WO-2015032409 A1 *   3/2015  ............... F03D 1/06
WO     WO2019128145 A1     7/2019

* cited by examiner

WIND TURBINE GENERATORS AND METHODS FOR ROTATING A HUB OF A WIND TURBINE

FIELD

The present disclosure relates to methods for rotating a hub of wind turbines. The present disclosure further relates to wind turbine generators, and wind turbines comprising generators.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly ("directly driven") or through the use of a gearbox. This way, the generator produces electricity which can be supplied to the electrical grid.

When wind turbines are erected, the tower is generally constructed first. Then, the nacelle, which in use usually contains the generator and the gearbox (if present), is mounted on top of the tower. Then, the rotor hub may be hoisted and mounted. Finally, the blades are hoisted one by one from a ground level towards the rotor hub and mounted on the hub. In an alternative method, one or more blades may be pre-assembled with the hub and be lifted together with the hub. The hub comprises a plurality of annular mounting flanges with openings. The blade comprises a plurality of fasteners, such as bolts, or pins or studs at its blade root. During installation, these fasteners are to be fitted into the openings in the mounting flanges.

The installation of wind turbine blades has become an increasingly challenging task due to the general tendency to considerably increase the size and weight of modern wind turbines.

The blades may be installed in a variety of ways, e.g., in a substantially vertical manner or substantially horizontally or at other angles of inclination. However, such methods require rotation of the hub between the mounting of one blade and the mounting of another blade to position the mounting flanges of the hub correctly with respect to the direction of the blade during fastening the connection. The provision of torque is required for rotating the unbalanced wind turbine rotor, i.e., when not all blades have been mounted on the hub and the weight of one or more blades has to be carried upwards. Thus, to correctly position the hub after mounting one or more blades a very high torque may need to be applied.

The torque may be delivered using e.g., external tools configured to provide the suitable torque to rotate the rotor hub. Even though the generator may be suitable for operating as a motor, it will generally not be able to deliver the required torque to rotate the hub, especially when the hub is unbalanced, i.e., when at least one blade, but not all the blades have been mounted.

Wind turbines comprise a converter or inverter to convert the power generated by the generator to make it compatible with the electrical grid. In theory, the converter of the wind turbine could be suitable to convert the power of the external power supply to run the generator as a motor. However, to provide a sufficient torque to make the hub rotate, the current supplied by the converter to the wind turbine generator must be very high. Furthermore, the voltage and the frequency must be very low. In this respect, the wind turbine converter may typically be configured to withstand an extra 30-40% of the rated current at low frequency.

For these reasons, wind turbine converters are in practice not generally suitable to provide a sufficient torque for rotating an unbalanced hub. To enhance the capabilities of the wind turbine controller for increasing the current delivered to the generator, the converter has to be completely redesigned. Such a redesign may imply oversizing the wind turbine converter for normal operation which may produce an extra cost and an extra weight. Furthermore, as the working ranges of the electrical parameters of such oversized converters are wider, the efficiency of the oversized converter when the wind turbine is generating power may be penalized. The efficiency of the wind turbine may therefore be reduced.

The present disclosure provides examples of systems and methods that at least partially overcome or mitigate some of the aforementioned disadvantages.

SUMMARY

In a first aspect, a method for rotating a hub of a wind turbine in an inching operation is provided. The wind turbine comprises a generator with a rotor and a stator, and the method comprises coupling a first string of a first electrical phase of the stator in series with a second string. The first and second strings comprise one or more coils coupled in series. Further, the method comprises providing current from a power converter to the first and second strings of the stator to rotate the hub. Herein, the second string is configured to be part of a second electrical phase during normal operation of the wind turbine.

According to this first aspect, the strings of an electrical phase of a wind turbine generator, which in normal operation of the wind turbine would be generally arranged in parallel, may be coupled in series during inching operation. With such an arrangement, the generator can provide higher currents. Moreover, the converter may provide a suitable current to the wind turbine generator such that a suitable torque for rotating the hub is generated during specific operations. Further, the fact that the strings coupled in series correspond to strings from different electrical phases in normal operation allows to considerably reduce the length of the connecting cables. This results in a considerable reduction in complexity of switching from one configuration to another and a reduction of material cost, while minimizing the connection assembly time. Herein, the term "normal operation" and "operation mode" relates to the generator configuration or generator mode in which the wind turbine is operating, the wind turbine rotor is driven by the wind and the generator converts mechanical power into electrical power.

To this end, the strings of an electrical phase of the wind turbine's generator may be reconfigured between an inching mode in which certain strings are connected in series (and thus a hub of the wind turbine may be rotated by providing current to the power converter) and a normal mode in which strings are connected in parallel (and thus the wind turbine can be operated normally).

In another aspect, a wind turbine generator is disclosed. The wind turbine generator comprises a stator configured to change from normal operation to inching operation. The stator in operating mode comprises a first electrical phase and a second electrical phase comprising more than one string connected in parallel. Further, the stator in inching mode comprises at least one string of the first electrical phase connected in series with a string of the second electrical phase. Herein, the first electrical phase and the second electrical phase refers to the operating mode. The strings of the stator in inching mode connected in series may form new electrical phases.

Throughout this disclosure, it may be understood that a string is an electrical conductor, e.g., a wire, included in the generator armature. A string may be wound forming turns, e.g., around an armature tooth. A group of turns may be referred to as a coil. In some examples, a coil may include just one turn. Thus, a string may comprise one or more coils. For instance, a string may comprise four coils and each coil may be wound around an armature tooth.

A changing magnetic field, e.g., a rotating magnetic field caused by the rotation of a rotor including permanent magnets, may induce an alternating voltage (and therefore also an alternating current) in an armature string. Throughout this disclosure, it may be understood that an electrical phase may be an alternating voltage induced in one or more strings connected in series or in parallel. Such a voltage may have a sinusoidal waveform. Thus, if an armature has for example three strings, each string may provide an electrical phase in presence of a varying magnetic field. Herein, a winding system refers to all strings which are coupled.

Accordingly, any reference to a string (or a plurality of strings) providing an electrical phase throughout this disclosure may refer to the fact that an alternating voltage is induced in said strings (e.g., in one or more coils of the string) by a varying magnetic field.

Two electrical phases may have an electrical phase difference between them. Herein, an electrical phase difference may be understood as an angular difference between two electrical phases. When the electrical phase difference between two electrical phases is zero (or a multiple of 360°; i.e. n·360° with n=1, 2, 3, . . . ), it may be said that the two electrical phases are in phase. When the electrical phase difference between two electrical phases is not zero, it may be said that the two electrical phases are out of phase. In a triphasic armature, i.e., an armature with three strings (or groups of strings) and each string provides an electrical phase, an electrical phase difference between any of two of the three electrical phases may for example be 120°.

Throughout the present disclose, a winding system may be regarded as a group of strings comprising a plurality of electrical phases connected to the same converter or converter module. A generator may include more than one winding system, each of the winding systems connected to their own converter or converter module.

BRIEF DESCRIPTION OF THE DRAWINGS

Non-limiting examples of the present disclosure will be described in the following, with reference to the appended drawings, in which.

DETAILED DESCRIPTION OF EXAMPLES

In these figures the same reference signs have been used to designate matching elements.

Figure 1:
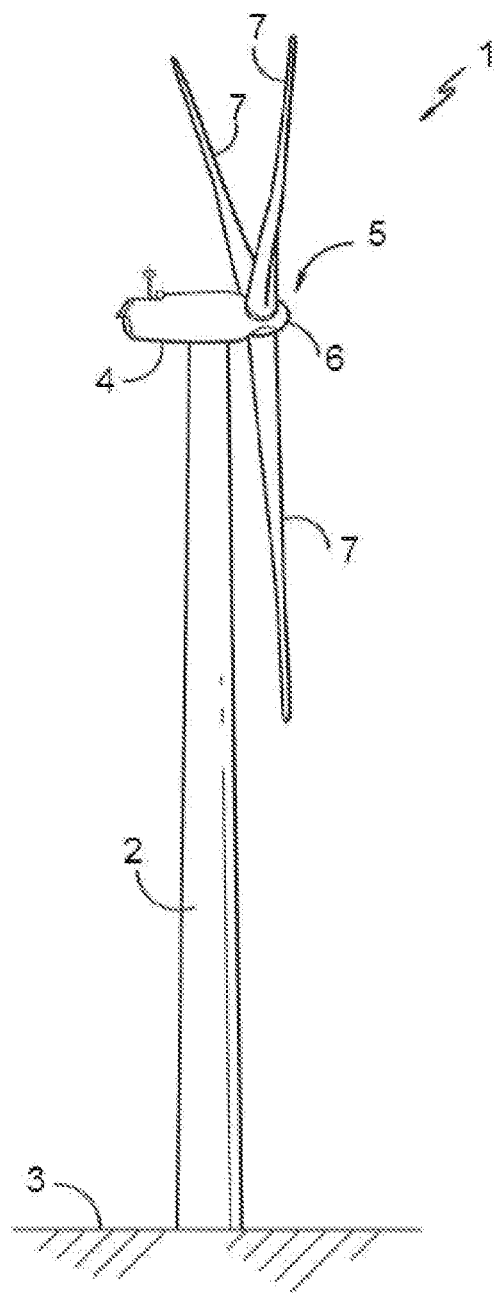
FIG. 1 illustrates a perspective view of a wind turbine according to one example.

FIG. 1 illustrates a perspective view of one example of a wind turbine 1. As shown, the wind turbine 1 includes a tower 2 extending from a support surface 3, a nacelle 4 mounted on the tower 2, and a rotor 5 coupled to the nacelle 4. The rotor 5 includes a rotatable hub 6 and at least one rotor blade 7 coupled to and extending outwardly from the hub 6. For example, in the illustrated example, the rotor 5 includes three rotor blades 7. However, in an alternative embodiment, the rotor 5 may include more or less than three rotor blades 7. Each rotor blade 7 may be spaced from the hub 6 to facilitate rotating the rotor 5 to enable kinetic energy to be transferred from the wind into usable mechanical energy, and subsequently, electrical energy. For instance, the hub 6 may be rotatably coupled to an electric generator 10 (FIG. 2) positioned within the nacelle 4 or forming part of the nacelle to permit electrical energy to be produced. In this example, the wind turbine is an onshore wind turbine, in other examples it may be an offshore wind turbine.

Figure 2:
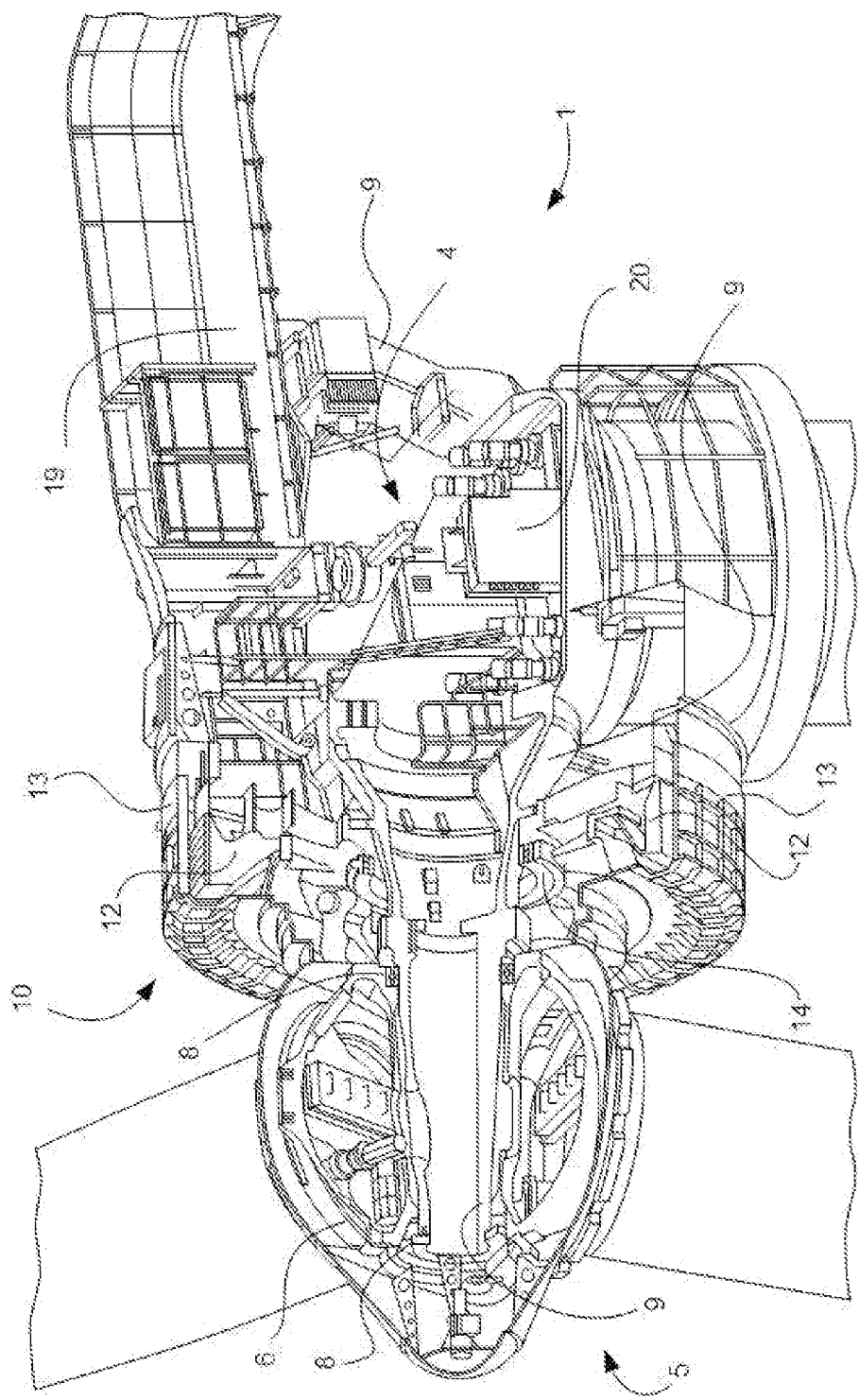
FIG. 2 illustrates a detailed, internal view of a nacelle of a wind turbine according to one example.

FIG. 2 illustrates a simplified, internal view of one example of a nacelle 4 of a direct drive wind turbine 1. As shown, the generator 10 may be disposed within the nacelle 4 or between the nacelle 4 and the rotor 5. In general, the generator 10 may be coupled to the rotor 5 of the wind turbine 1 for generating electrical power from the rotational energy generated by the rotor 5. For example, the rotor 5 of the wind turbine may include a hub 6 coupled to a rotor 12 of a generator 10 for rotation therewith. The rotation of the hub 6 may thus drive the rotor 12 of the generator 10.

In FIG. 2, the wind turbine rotor 5 may be rotatably mounted on a support frame 9 through two rotor bearings 8. In other examples, the support frame 9 may not extend through the hub 6 and therefore the rotor may be supported by a single rotor bearing 8, commonly called as the main bearing.

The generator 10 may comprise a rotor 12 and a stator 13. The stator may be rigidly mounted on the support frame 9. The rotor may be rotatably mounted on the stator through a generator bearing 14 so that the rotor may rotate with respect to the stator around an axis.

The generator 10 may be electrically coupled to the converter 20. The wind turbine converter 20 may adapt the output electrical power of the generator to the requirements of the electrical grid. In this example, the converter 20 is placed inside the nacelle 4, however, in other examples it may be placed in other locations of the wind turbine, e.g., in the top tower portion or in the bottom tower portion. In large offshore wind turbines, the converter may be a medium voltage converter, e.g., with a nominal voltage between 2 kV and 5 kV, for reducing electrical losses and expensive cables.

Figure 3:
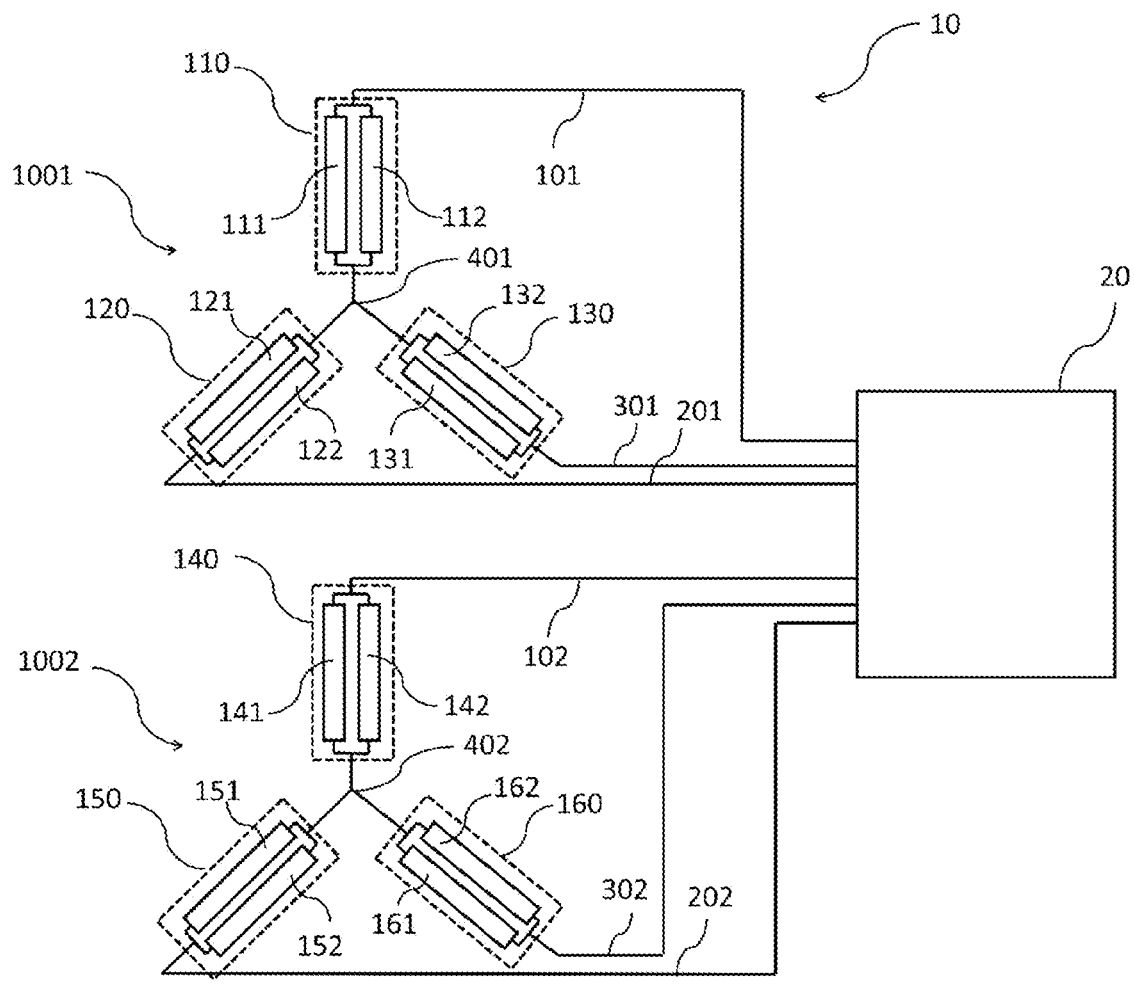
FIG. 3 schematically illustrates an electrical connection between a wind turbine converter and a wind turbine generator comprising strings connected in parallel according to an example.

FIG. 3 schematically illustrates the electrical connection between a wind turbine converter and a wind turbine generator. The generator comprises strings connected in parallel according to an example. In this example, the converter 20 is electrically coupled to the generator 10 of e.g., a direct drive wind turbine. Electrical power generated in the generator 10 is converted to an AC power of suitable frequency and phase and delivered to an electrical grid (in normal operation).

The converter 20 may further be connected to a power source (not illustrated in this figure) to power the converter in an inching operation. The power source may be e.g., a fuel generator group, a battery, or an electrical grid.

The generator 10 in this example comprises two independent winding systems 1001, 1002 in a configuration in case of normal operation. A first winding system 1001, comprises three electrical phases 110, 120, 130. Each phase in this example comprises two electrical strings although a different number of strings in any of the phase is possible, as well as a different number of phases. In this example, the electrical phase 110 comprises the strings 111, 112, the electrical phase 120 comprises the strings 121, 122 and the electrical phase 130 comprises the strings 131, 132, the two strings of each of the phases being arranged in parallel.

A second winding system 1002, comprises three electrical phases 140, 150, 160. Again, each phase comprises two electrical strings although a different number of strings in any of the phase is possible, as well as a different number of phases. More specifically, the electrical phase 140 in this example comprises the strings 141, 142, the electrical phase 150 comprises the strings 151, 152 and the electrical phase 160 comprises the strings 161, 162.

In this example, the winding systems 1001, 1002 are shown in normal mode, i.e., the configuration generally employed during normal operation when the wind sets the wind turbine rotor in rotation and the wind turbine rotor rotates the rotor of the generator. The strings of the three electrical phases 110, 120, 130 of a first winding system 1001 are coupled in parallel. Particularly, the pairs of strings 111-112, 121-122, 131-132 are connected in parallel between a point of connection 401 e.g., a neutral and a point of connection 101, 201, 301 to the converter 20, respectively. Similarly, the strings of the three electrical phases 140, 150, 160 of a second winding system 1002 are coupled in parallel. Particularly, the pairs of strings 141-142, 151-152, 161-162 are connected in parallel between a point of connection 402 e.g., a neutral and a point of connection 102, 202, 302 to the converter 20, respectively.

Although not shown, the strings 111, 112, 121, 122, 131, 132, 141, 142, 150, 152, 161, 162 may comprise a plurality of coils e.g., two, four, six or any other number of coils coupled in series between them. Each of the coils may be arranged around teeth of a stator yoke.

The generator 10 may further comprises a plurality of electrical interfaces connecting electrical strings of the generator to the converter 20 and/or to the neutral points. The electrical interfaces have not been illustrated in the present example to reduce clutter.

As an example, the string 111 may be connected between a first electrical interface and a second interface. It is noted that the first electrical interface(s) may be connected to the converter at the point of connection 101, 201, 301 and the second interface(s) may be connected to the connection 401 e.g., neutral point. The same type of connection can be arranged between each of the strings of the first and second winding systems.

It is further noted that, in some specific examples each interface may comprise further connectors to couple a plurality of strings from different phases or even from different winding systems. The strings of the remaining electrical phases 120, 130 of the first winding system 1001 and the electrical phases 140, 150, 160 of the second winding system 1002 may be arranged in parallel between them using electrical interfaces in substantially a similar manner as described for the string 111 of the electrical phase 110.

Moreover, the electrical interfaces may be mounted in suitable supports. The electrical interfaces may thus be easily removed from the generator.

The configuration of the wind turbine generator described in this figure may be employed during the normal operation of the wind turbine i.e., when there is no need to rotate an unbalanced hub, and when the generator is used as a generator (rather than a motor).

Particularly, with such a string configuration, the current provided by the converter 20 to the corresponding electrical phases 110, 120, 130, of the first winding system 1001 may be divided between the number of strings of each electrical phase. For example, the rated current provided by the power converter to the first phase 110 of the generator may be $I_a$. However, the current at each string 111, 112 of the electrical phase 110 is $I_a/2$, where 2 refers to the number of strings connected in parallel. Similarly, the rated current provided by the converter to the second phase 120 may be $I_b$ and the rated current provided by the converter to the third phase 130 may be $I_c$. In this case, the current at each string of the phase 120 and the phase 130 is $I_b/2$ and $I_c/2$ respectively. The same applies to the second winding system 1002.

As commented above, to provide a sufficient torque to make the hub rotate (particularly an unbalanced hub with only one or two blades mounted), the current supplied by the converter 20 to the wind turbine generator 10 may need to be very high to provide sufficient torque to rotate the hub. Furthermore, the voltage and the frequency must be very low. Typically, the current needed at the coils of the generator 10 to rotate an unbalanced hub may be at or near 0.5 of the rated current ($I_a$, $I_b$, $I_c$) supplied by the converter(s).

In this respect, to reach the above-commented desired current ($I_a/2$) at the coils of each electrical phase 110, 120, 130, of the generator 10, the current supplied by the converter 20 may be at least n-times the desired current at the coils, where n refers to the number of strings connected in parallel. In case of having 4 strings the current supplied by the converter 20 may be two times the rated current of the converters ($I_a*2$). It is thus clear that it may be difficult to supply a suitable current with the converter (and thus an extra converter may be necessary to allow the overcurrent motorizing operation of the generator with such a generator electrical configuration). Still in this case, the high currents in the generator might cause a problem of overheating.

Figure 4:
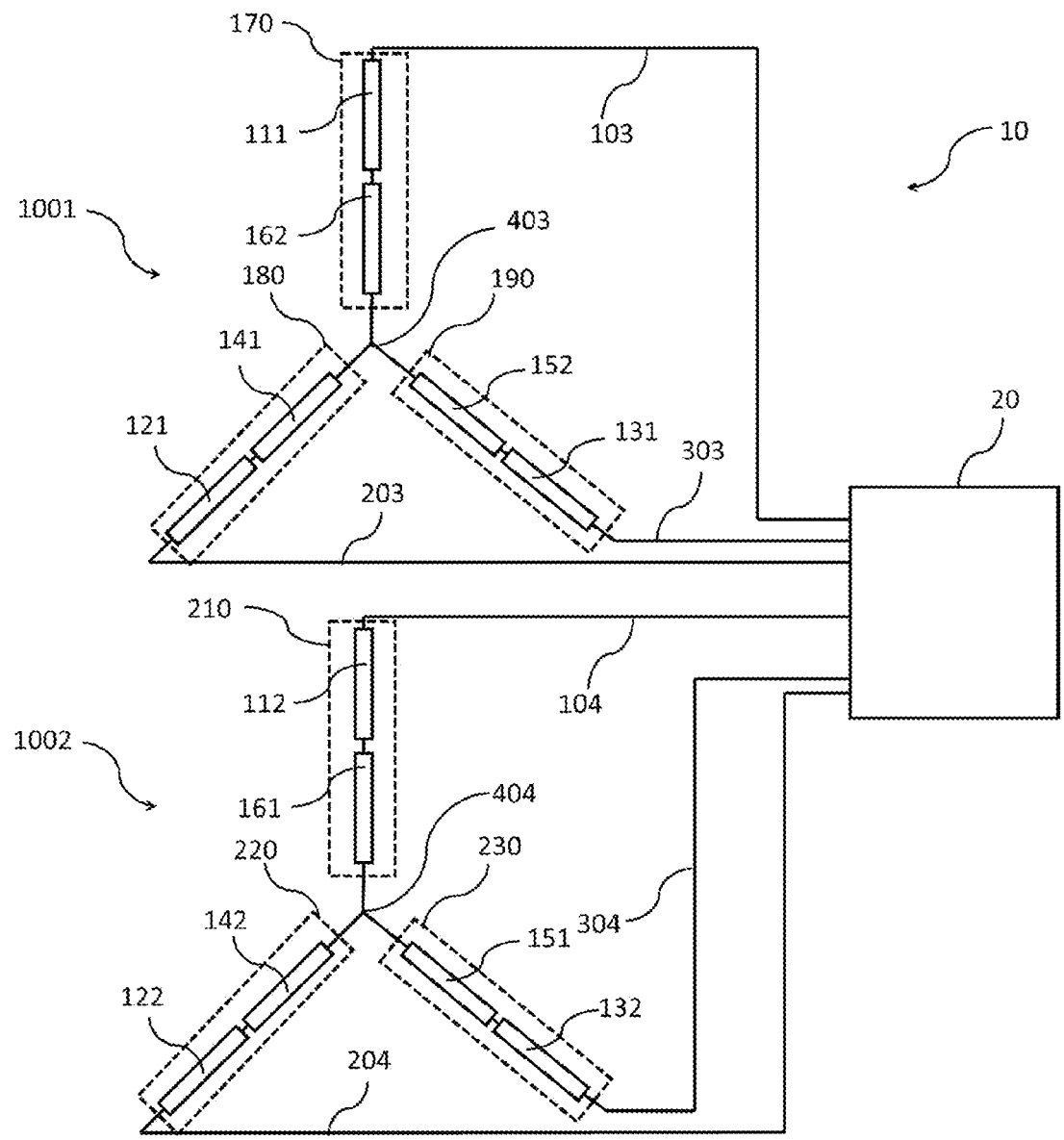
FIG. 4 schematically illustrates an electrical connection between a wind turbine converter and a wind turbine generator comprising strings connected in series according to another example.

FIG. 4 schematically illustrates an example of an electrical connection between a wind turbine converter 20 and a wind turbine generator 10 comprising the same strings as in FIG. 3 but rearranged in inching mode. Particularly, each winding system 1001, 1002 has been reconfigured so that it comprises strings connected in series. The strings from each of the winding systems correspond to strings from different electrical phases in operation mode. In the present example, the strings connected in series are in fact from different winding systems during operation mode, but strings from the same winding system can also be used to reconfigure the generator in inching mode.

To this end, FIGS. 3 and 4 illustrate a wind turbine generator 10 configured to switch from a normal mode to an inching mode by changing a coupling between a plurality of strings from a parallel coupling i.e., 111-112 during normal mode to a coupling in series i.e. 111-162 during inching mode. At least two of the strings coupled in series in inching mode include strings from different electrical phases in the normal mode.

In FIG. 4, a first winding system 1001 is rearranged so that it comprises three electrical phases 170, 180, 190. The three electrical phases 170, 180, 190 comprise two strings connected in series, but other arrangements of electrical phases and strings are also possible. The first electrical phase 170 comprises a string 111 pertaining to electrical phase 110 of the first winding system 1001 in operation mode and a string 162 pertaining to electrical phase 160 of the second winding system 1002 in operation mode. Similarly, the second electrical phase 180 comprises a string 141 pertaining to electrical phase 140 of the second winding system 1002 in operation mode and a string 121 pertaining to electrical phase 120 of the first winding system 1001 in operation mode. The third electrical phase 190 comprises a string 152 pertaining to electrical phase 150 of the second winding system 1002 in operation mode and a string 131 pertaining to electrical phase 130 of the first winding system 1001 in operation mode.

Further, a second winding system 1002 is rearranged in a similar manner. Thus, the second winding system 1002 in inching mode comprises three electrical phases 210, 220, 230 comprising two strings connected in series. The first electrical phase 210 comprises a string 112 pertaining to electrical phase 110 of the first winding system 1001 in operation mode and a string 161 pertaining to electrical phase 160 of the second winding system 1002 in operation mode. Similarly, the second electrical phase 220 comprises a string 142 pertaining to electrical phase 140 of the second winding system 1002 in operation mode and a string 122 pertaining to electrical phase 120 of the first winding system 1001 in operation mode. The third electrical phase 230 comprises a string 151 pertaining to electrical phase 150 of the second winding system 1002 in operation mode and a string 132 pertaining to electrical phase 130 of the first winding system 1001 in operation mode.

Thus, in inching mode a first string is part of a first winding system in normal operation and a second string is part of a second winding system in normal operation.

The electrical phases in the winding systems may comprise a string coupled between a point of connection 403, 404 e.g., neutral and the next string, and a string coupled between a point of connection 103, 203, 303, 104, 204, 304 to the converter 20 and a previous string. Herein, "next" and "previous" are exclusively used as a relative indication of the string-to-string connection.

The first and second strings may be selected such that a phase angle difference (in normal operation) is the smallest possible, i.e. the smallest available in a given generator configuration. Selecting strings with smaller phase angle differences will reduce the necessary currents from the converters.

One or more of the strings connected in series in the inching mode (or in inching operation) may be connected with reverse polarity as compared with their connection in normal mode (or in normal operation). This can be done to be able to select smallest possible phase angle differences between strings connected in series. Reducing the phase difference may optimize the electrical arrangement and minimize the increment in current to be provided by the power converter.

Following the example, the current provided by the converter 20 and the current at the strings of the corresponding electrical phase 170, 180, 190, 210, 220, 230 may be substantially the same. Similarly to the example of FIG. 3, the rated current provided by the power converter to the first phase 170 of the first winding system 1001 of the generator 10 may be $I_a$. However, differently as before, the rated current at each string 111, 162 of the electrical phase 170 may be $I_a$ (instead of $I_a/2$ as disclosed in the example of FIG. 3).

Moreover, the (rated) current provided by the converter to the second phase 180 may be $I_b$ and the (rated) current provided by the converter to the third phase 190 may be $I_c$. However, again differently as in the example of FIG. 3, the current at each string of the phase 180 and the phase 190 may be substantially $I_b$ and $I_c$ respectively.

As previously discussed, phase differences between strings connected in series may lead to a need to increase the current supplied by the power converted. Therefore, with such an arrangement, the current supplied by the converter 20 may be slightly above half of the rated current of the converters. This current level may be enough to reach the above-commented desired current at the coils of each electrical phase 170, 180, 190 to rotate the hub. The same is true for the electrical phases of the second winding system 1002 in inching mode.

It should be clear that, with the illustrated electrical configuration of the generator, the desired current at the coils of the generator is more easily supplied by the wind turbine converters. There is thus no need to redesign the power converter to increase the current delivered to the generator. Such redesign may imply oversizing the wind turbine converter which may produce an extra cost and an extra weight. Moreover, the need of an auxiliary converter particularly configured to provide a suitable current to the wind turbine generator such that the hub is rotates is avoided.

The structure and operation of the remaining components of the system may be substantially the same as hereinbefore described. It is noted that the configuration of the wind turbine generator described in this figure, i.e., inching mode, may be employed when there is a need to rotate an unbalanced hub.

In the illustrated example, two winding systems in normal operation were shown to be reconfigured to two winding systems in inching operation. In other examples, strings from two different winding systems in operation mode may be coupled to define a single winding system in inching mode. This may allow to use a single power converter during an inching operation and can simplify the controller design and reduce the converter cooling requirements.

Figure 5:
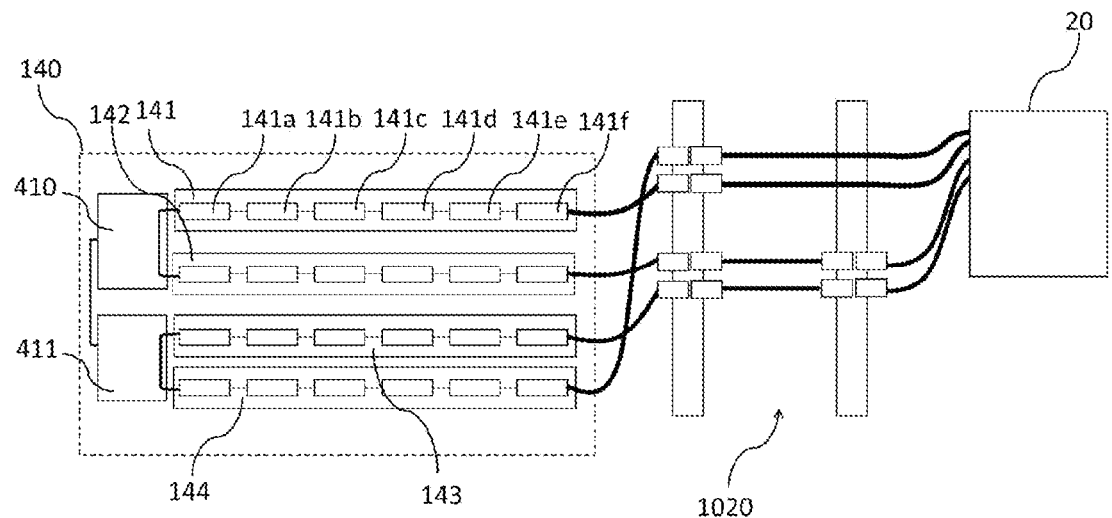
FIG. 5 schematically illustrates a detailed electrical connection between an electrical phase of a wind turbine converter and a wind turbine generator comprising strings connected in parallel according to a further example.

FIG. 5 shows another example of generator according to the present disclosure. In particular, FIG. 5 shows a detailed view of an electrical phase of a second winding system in operation mode. As shown in the detail of FIG. 5, the electrical phase 140 comprises four strings 141, 142, 143, 144. Each string comprises a plurality of coils e.g., six coils coupled in series between them. For example, the string 141 comprises the coils 141a-141f connected in series. The generator further comprises two electrical interfaces 410, 411. The electrical interfaces may be temporarily mounted in supports.

Further, the example in FIG. 5 shows that the generator may comprise a power distribution interface 1020 between the power converter 20 and the strings 141, 142, 143, 144. The power distribution interface 1020 acts as a busbar and may be used to connect the strings of the generator to the power converter 20. The power distribution interface 1020 may comprise one or more racks providing support to the connectors enabling connection between the generator cables and the converter cables. Thus, the electrical connection provided by the electrical interfaces 410, 411 and the power distribution interface 1020 may couple the strings 141, 142, 143, 144 in parallel.

Note that the example in FIG. 5 is analogous to the example in FIG. 3 but with additional strings per electrical phase. In the present example, these additional strings are two additional strings 143, 144. Other numbers of additional strings could be used in other examples. The addition of further strings may also lead to the provision of more electrical interfaces to achieve a more structured and accessible electrical installation.

Figure 6:
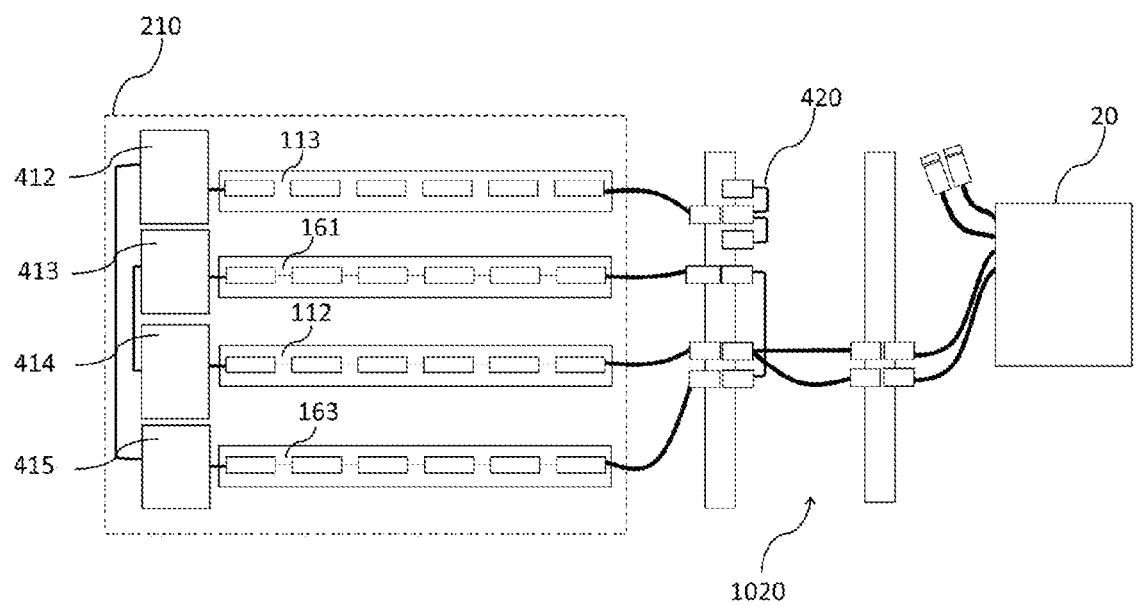
FIG. 6 schematically illustrates a detailed electrical connection between an electrical phase of a wind turbine converter and a wind turbine generator comprising strings connected in series according to yet a further example.

FIG. 6 shows schematically an electrical phase of the second winding system shown in FIG. 5 in inching configuration. In particular, FIG. 6 shows a detailed view of an electrical phase 210 of a second winding system 1002. As discussed in relation with FIG. 5, the electrical phase 210 comprises four strings, the two strings 112, 161 connected originally in parallel in normal operation mode plus two additional strings 113, 163 also connected in parallel. The electrical phase 210 in other examples can also be configured with a different number of strings, i.e., three, five, six or any other number of strings Further, each string comprises a plurality of coils e.g., six coils coupled in series between them. The generator further comprises four electrical interfaces 412, 413, 414, 415.

The electrical connections illustrated in FIGS. 5 and 6, e.g., between strings and interfaces, correspond to connections defining a closed electrical circuit. Other connections suitable to rearrange the coupling between strings may exist, but these have not been represented to reduce clutter.

Following the example, the power converter 20 may be connected via a power distribution interface 1020 to string 112. The string 112 (comprising in the present example six coils in series) may be connected in series to the string 161 via the electrical interfaces 414, 413. The string 161 may be connected in series to the string 163 via the power distribution interface 1020. Following the example, the string 163 may be connected in series to the string 113 using the electrical interfaces 415 and 412. Further, the string 113 may be connected to the power distribution interface 1020, and more precisely to a neutral point 420 of the power distribution interface 1020. Thus, the strings 112, 161, on the one hand and strings 163, 113 on the other hand are coupled in series between them.

It is noted that to achieve this configuration, a relatively high number of electrical interfaces is required, particularly when compared with the number of electrical interfaces required in the generator's configuration disclosed in FIG. 5. In this example, the wind turbine may comprise four interfaces 412, 413, 414, 415 to connect the strings of an electrical phase in series, whereas the generator may comprise only two interfaces (elements 410, 411 shown in FIG. 3) to connect the strings of an electrical phase in parallel. As a result, when the generator is operating in normal operation (and thus the strings are connected in parallel), some of the interfaces are not required and they may be removed from the generator.

In examples, a first string 112 of a generator 10 may be coupled in series with a second string 161 to form an electrical phase 210 of the generator. The coupling between strings may comprise mounting an electrical interface(s) 413, 414 in a support, connecting the first string 112 to the electrical interfaces 413, 414 and connecting the second string 161 to the electrical interface 413, 414 such that the first and second strings 112, 161 are connected in series.

Additionally, a generator in inching mode may be rearranged to assume a normal configuration, as shown in FIG. 3, for the wind turbine to be operated.

Moreover, as commented above, the generator 10 may comprise a stator, a rotor and an air gap arranged between the stator and the rotor, wherein the rotor is configured to rotate around a rotational axis and wherein the first and the second strings, for example strings 111, 112 with the corresponding coils are located in the stator.

Additionally, the stator may comprise multiple electrical phases 110, 120, 130 wherein the first and second strings 111, 112 form part of the same electrical phase 110 in operation mode and wherein the former strings form part of different electrical phases 170, 210 during inching mode. In fact, the first and second strings 111, 112 may form part of different winding systems after the generator has been rearranged from operation mode to inching mode.

To this end, a wind turbine generator 10 is provided. The wind turbine generator 10 comprises a stator configured to change from an operating mode to an inching mode.

The stator in operating mode comprises a first electrical phase 110 and a second electrical phase 160 comprising more than one string connected in parallel 111-112, 161-162, and the stator in inching mode comprises at least one string 112 of the first electrical phase 110 connected in series with a string 161 of the second electrical phase 160.

According to this aspect, a generator may be configured to selectively couple strings in series from different electrical phases in operation mode. Electrical interfaces may be provided to perform the coupling.

In normal operation, the strings of each electrical phase may be coupled in parallel. However, when a hub is unbalanced, and a rotation of an unbalanced hub of a wind turbine is desired, the winding system(s) are rearranged so that strings from different phases during normal operation may be coupled in series. With such an arrangement, a suitable current may be supplied to the wind turbine generator such that a torque for rotating the unbalanced hub is generated.

Moreover, the wind turbine may further comprise one or more power converters 20 configured to provide current to the electrical phases 170, 180, 190, when the strings are connected in series, to rotate an unbalanced hub of the wind turbine.

In examples the generator is a doubly fed induction generator. In this case, the wind turbine may further comprise: a main transformer for connecting the wind turbine generator 10 to a grid, wherein the power converters are arranged between the wind turbine generator 10 and a point of connection to a main transformer, wherein the converter(s) 20 comprise a grid side converter electrically coupled to the main transformer and a machine side converter electrically coupled to a rotor of the generator 10, a stator bus for connecting a stator of the generator 10 and the main transformer, one or more rotor buses for connecting the rotor of the generator 10 and the converters, and one or more line side buses for connecting the converters and a point of connection to the main transformer.

Alternatively, the generator 10 may be a permanent magnet synchronous generator. In this case, the wind turbine may further comprise: a main transformer for connecting the wind turbine generator 10 to a grid, wherein the power converter(s) 20 are arranged between the wind turbine generator and a point of connection to the main transformer, wherein the converter(s) 20 comprises a grid side converter electrically coupled to the main transformer and a machine side converter electrically coupled to the wind turbine generator 10. The wind turbine further comprises a first bus for connecting the wind turbine generator and the converters and a second bus for connecting the converters and the main transformer.

As commented above, the power delivered from the power source may be adapted by the converter to supply a high current to the generator acting as a motor. The converter may supply a current to the generator above 1500 A, specifically above 2000 A, and more specifically above 2500 A. The required low voltage at the generator may be e.g., between 50 V and 600 V. The required frequency may be between 0.1 Hz and 10 Hz. These values may allow the generator to rotate the hub i.e., compensate the gravitational forces acting on the blades when the hub is unbalanced. As the voltage and frequency provided by the converter may be relatively low, the speed of rotation of the generator is low and the control of the position of the rotor (and thus the hub) may be more accurate. Moreover, these suitable voltage, current and frequency values may be provided by standard wind turbine converter(s) i.e., the converter(s) for supplying energy captured from the wind to the electrical grid.

Moreover, the temperature of the wind turbine generator may be monitored. As an example, if the monitored temperature is above a temperature threshold, the power source may be switched off.

It is noted that the current may be proportional to the torque and the torque necessary to make the hub rotate may depend on the weight of the blades and its length. Heavy and long blades may thus require a greater torque.

In some examples, the converter 20 may include a dedicated controller (not shown) configured to be coupled to the wind turbine controller for controlling the rotation of the hub. In other examples, the converter controller may control the angular position of the hub without being connected to the wind turbine controller. In this configuration, the controller may receive the angular position of the rotor of the generator from an encoder.

The converter controller may include one or more processor(s) and associated memory device(s) configured to perform a variety of computer-implemented functions (e.g., performing the methods, steps, calculations and the like and storing relevant data as disclosed herein) according to any of the methods herein described. According to this aspect, the controller may perform various functions, such as receiving, transmitting and/or executing control signals, e.g., modifying the electrical parameters of the power delivered to the generator for varying the torque or the rotational speed.

The converter's controller may also include a communications module to facilitate communications between the converter's controller and the wind turbine generator and/or the wind turbine controller. Further, the communications module may include a sensor interface (e.g., one or more analog-to-digital converters) to permit signals transmitted from one or more sensors to be converted into signals that can be understood and processed by the processors. It should be appreciated that the sensors may be communicatively coupled to the communications module using any suitable means as for example a wired connection or a wireless connection. As such, the processor may be configured to receive one or more signals from the sensors. In this way, a sensor may be an encoder arranged on the generator for controlling the angular position of the rotor of the generator.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor is also configured to compute advanced control algorithms and communicate to a variety of Ethernet or serial-based protocols (Modbus, OPC, CAN, etc.). Additionally, the memory device(s) may comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may be configured to store suitable computer-readable instructions that, when implemented by the processor(s), configure the controller to perform the various functions as described herein.

In examples, the wind turbine generator may be manufactured comprising a configuration as described in FIG. 4, wherein the strings of the electrical phases of the wind turbine's generator are connected in series. A suitable current to rotate an unbalanced hub of a wind turbine during the installation of the blades may thus be provided. However, once the unbalanced hub is rotated to install the corresponding blades to the wind turbine rotor hub, the generator may be reconfigured such the strings from different phases in inching mode are connected in parallel, defining a new electrical phase and providing the generator with a configuration to operate in normal mode as described in FIG. 3. In further examples, the generator may be reconfigured such that the strings from different winding systems in inching mode are connected in parallel.

In a further example, the generator may further comprise a plurality of switches configured to switch from an inching mode to an operation mode or vice versa.

The wind turbine generator may comprise a first series and a second series of switches. The first series of switches may be circuit breakers and the second series may be transfer switches. Particularly, the transfer switches may be arranged to connect the strings of an electrical phase in series or in parallel. Moreover, the circuit breakers may be arranged to selectively connect a corresponding string of the phase to a neutral point of connection. The circuit breakers could be solid date devices, such as IGBT's.

A control signal that orders the switches and the breakers to be operated may be generated at the level of a supervisory control and data acquisition system (SCADA) of a wind park.

Figure 7:
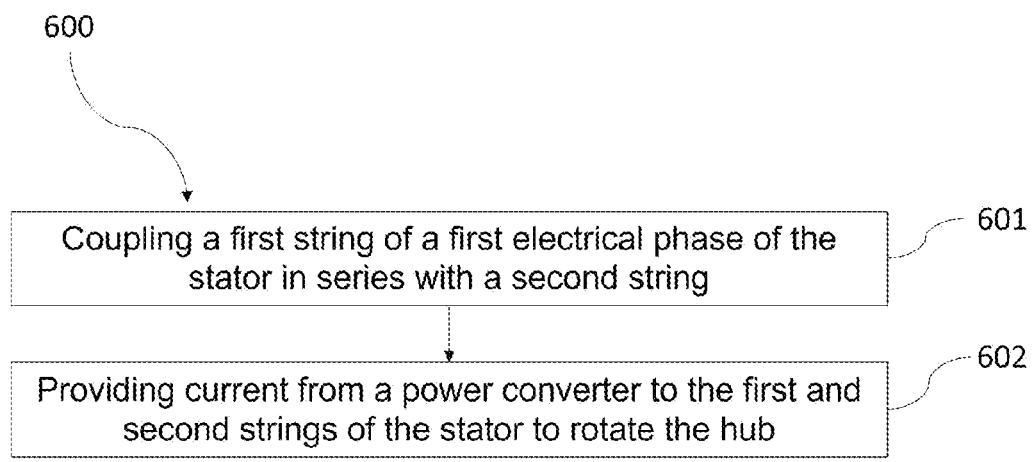
FIG. 7 is a flow diagram of a method of rotating an unbalanced hub of a wind turbine according to an example.

FIG. 7 is a flow diagram of an exemplary method of rotating an unbalanced hub of a wind turbine. The wind turbine has a generator with a rotor and a stator. The method 600, at block 601, comprises coupling a first string 112 of a first electrical phase 110 of the stator in series with a second string 161. Herein, the first and second strings 112, 161 may comprise one or more coils coupled in series. The second string 161 is configured to be part of a second electrical phase 160 during normal operation of the wind turbine. Further, in block 602, the method 600 comprises providing current from a power converter 20 to the first and second strings 112, 161 of the stator to rotate the hub.

The above-mentioned coupling step of the wind turbine's generator may be set up in a factory before installation of the wind turbine, after the installation of the wind turbine (before the wind turbine is operated) or after the wind turbine has been operated.

The methods disclosed in the present disclosure can be combined with generators comprising the technical features disclosed in the present disclosure.

It is noted that power may be supplied from a power source to the converter. The power source may be e.g., a fuel generator group and it may be supplied at a low voltage. A fuel generator group may be used for rotating the hub e.g., in offshore environments because the electrical grid may not be available during the construction, installation and commissioning of the wind farm. In examples, a transformer may be provided to step up the voltage provided by the fuel generator group. The auxiliary transformer may be coupled between the fuel generator group and a wind turbine main transformer.

Alternatively, the power source may be the electrical grid.

In case the power source is the fuel generator group, an auxiliary transformer may be provided. The auxiliary transformer may be coupled between the fuel generator group and a wind turbine main transformer, wherein the auxiliary transformer is configured to raise the voltage supplied by the fuel generator group, specifically from a low voltage to a medium voltage.

In examples, the temperature at the wind turbine generator 10 may be monitored. If the monitored temperature is above a temperature threshold, the above-commented power source may be switched off.

Additionally, the method may comprise rotating the hub to a predetermined position. Further, the method may also comprise installing a blade at the hub in the predetermined position.

In other examples, the hub may be rotated e.g., for dismounting a damaged blade from the hub. In these examples, a damaged blade, e.g., broken by a lightning, may unbalance the hub. Therefore, to position the hub in position wherein the damaged blade may be easily disconnected from the hub, e.g., in a substantially vertical position, the hub has to be rotated. As the wind turbine is connected to the electrical grid, the electrical grid may be used as power source for motorizing the wind turbine generator. In some examples, the electrical grid may be available during the construction of the wind farm and therefore the electrical grid may be used as power source.

In examples wherein a first blade is to be installed, the first rotation of the hub may be carried out using a generator or some auxiliary driving equipment which is suitable for rotating a hub carrying no blades (but may not necessarily be powerful enough to rotate an imbalanced hub with a single blade or two blades).

It is noted that, at this stage, there may still not be any need to take advantage of the inching mode wherein the strings of the generator are arranged in series. Since no blade has been installed to the hub, the hub remains balanced and therefore there is no need to provide a high torque to rotate the hub.

At this point, the root flange of the first blade may be connected to a first mounting surface of the hub. Connecting the first blade to the hub may involve using fasteners e.g., studs or bolts.

It is noted that, after installing the first blade, the hub may be in a position which may not be appropriate for installing the second blade. A second mounting position is the angular position of the hub wherein the second blade and the hub are to be connected. In this position, a second mounting surface of the hub will face the root flange of the blade to be installed. By controlling the parameters of the power delivered from the converter to the generator (in inching mode), the speed of the rotation of the hub may be controlled.

For example, if the second blade is to be installed in a substantially vertical position, the second mounting position of the hub may correspond to a position wherein a second mounting surface points towards the sea or the floor. In other words, in the second mounting position the first mounting surface may correspond to a 6 o'clock position, whereas the first and the third mounting surfaces may correspond to a 2 o'clock and a 10 o'clock position, as the mounting surfaces of the hub are separated by 120°.

In those cases, wherein the second blade is to be installed in a substantially horizontal position, the second mounting surface may be in a 3 o'clock position when the hub is positioned in the first mounting position. The remaining mounting surfaces are separated by 120° and therefore the second and the third mounting surfaces may correspond to a 7 o'clock and to 11 o'clock position.

However, in other examples, the second blade may be installed at different angles.

In some examples, the method may additionally comprise blocking the rotation of the hub after positioning the hub in the right position by e.g., using a pin lock that blocks the rotation of the generator rotor with respect to the stator.

In summary, the hub may be rotated to a predetermined position and a blade may be installed at the hub in the predetermined position. Alternatively, the hub may be rotated to a predetermined position; and a blade may be removed from the hub in the predetermined position.

This written description uses examples to disclose the present teaching, including the preferred embodiments, and also to enable any person skilled in the art to practice it, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for rotating a hub of a wind turbine in an inching operation to rotate the hub, the wind turbine having a generator with a rotor and a stator, and the method comprising:
for the inching operation, coupling a first string of a first electrical phase of the stator in series with a second string of a second electrical phase of the stator, the first and second strings comprising one or more coils coupled in series;
providing current from a power converter to the first and second strings of the stator to rotate the hub; and
wherein the generator comprises a first and a second winding system, each of the first and second winding systems comprising a plurality of electrical phases in a normal operation of the generator, and wherein the first string of the first electrical phase is part of the first winding system in the normal operation of the generator, and the second string of the second electrical phase is part of the second winding system in the normal operation of the generator.

2. The method of claim 1, wherein the hub is unbalanced during the inching operation.

3. The method of claim 1, further comprising reconfiguring the generator from the inching operation to the normal operation of the generator by:
connecting the first string in parallel with at least another string of the first electrical phase and connecting the second string in parallel with at least another string of the second electrical phase; and operating the wind turbine in the normal operation of the generator.

4. The method according to claim 1, wherein coupling the first string in series with the second string comprises connecting the first and second strings to an electrical interface.

5. The method according to claim 1, wherein a fuel generator power source supplies power to the power converter, the method further comprising:

providing an auxiliary transformer;

coupling the auxiliary transformer between the fuel generator power source and a wind turbine main transformer, wherein the auxiliary transformer is configured to raise the voltage supplied by the fuel generator power source.

6. The method according to claim 1, further comprising:

rotating the hub to a predetermined position; and installing a blade at the hub in the predetermined position.

7. The method according to claim 1, further comprising:

rotating the hub to a predetermined position; and removing a blade from the hub in the predetermined position.

8. The method according to claim 1, wherein the generator includes a plurality of switches and the method further comprises switching from the inching operation to the normal operation of the generator or vice versa by operating the plurality of switches.

9. The method according to claim 1, wherein a polarity of at least one of the strings in the inching operation is reversed as compared to the polarity of the string during the normal operation of the generator.

10. The method according to claim 1, further comprising:

mounting an electrical interface in a support, connecting the first string to the electrical interface; and connecting the second string to the electrical interface such that the first and second strings are connected in series.

11. The method according to claim 1, wherein providing current from a power converter to the first and second strings connected in series comprises providing current from the power converter at between 50% to 75% of a rated current of the power converter.

12. A wind turbine generator comprising:

a stator configured to switch between a normal operating mode and an inching mode for rotating a hub of a wind turbine;

the stator in the normal operating mode comprising a first electrical phase in a first winding system and a second electrical phase in a second winding system, wherein each of the first and second winding systems comprising a plurality of electrical phases, each of the first and second electrical phases comprising a plurality of strings connected in parallel; and the stator in the inching mode comprising at least one string of the first electrical phase connected in series with a string of the second electrical phase.

13. The wind turbine generator of claim 12, further comprising switches configured to connect the strings in series.

* * * * *